(12) United States Patent
Li

(10) Patent No.: US 12,022,017 B2
(45) Date of Patent: Jun. 25, 2024

(54) ELECTRONIC DEVICE

(71) Applicant: VIVO MOBILE COMMUNICATION CO., LTD., Guangdong (CN)

(72) Inventor: Jin Li, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 187 days.

(21) Appl. No.: 17/727,319

(22) Filed: Apr. 22, 2022

(65) Prior Publication Data

US 2022/0247845 A1 Aug. 4, 2022

Related U.S. Application Data

(63) Continuation of application No. PCT/CN2020/123902, filed on Oct. 27, 2020.

(30) Foreign Application Priority Data

Oct. 31, 2019 (CN) .......................... 201911053904.X

(51) Int. Cl.
*G06F 1/16* (2006.01)
*H04M 1/02* (2006.01)
(Continued)

(52) U.S. Cl.
CPC .......... *H04M 1/0264* (2013.01); *H04N 23/51* (2023.01); *H04N 23/57* (2023.01); *H04M 2250/52* (2013.01)

(58) Field of Classification Search
CPC .... G06F 1/1626; G06F 1/1633; G06F 1/1656; G06F 1/1675; G06F 1/1686; H04M 1/0264
See application file for complete search history.

(56) References Cited

U.S. PATENT DOCUMENTS 5,748,441 A * 5/1998 Loritz .................. G06F 1/1643
345/169
11,818,842 B1 * 11/2023 Carrillo ................. H05K 1/145
(Continued)

FOREIGN PATENT DOCUMENTS

CN 108900755 A 11/2018
CN 208046676 U 11/2018
(Continued)

OTHER PUBLICATIONS

International Search Report and Written Opinion for Application No. PCT/CN2020/123902, dated Jan. 18, 2021, 9 Pages.
(Continued)

*Primary Examiner* — Anthony Q Edwards
(74) *Attorney, Agent, or Firm* — Brooks Kushman P.C.

(57) ABSTRACT

An electronic device is provided, including: a display screen, a device shell, an accommodating cavity, a first opening, a protective cover, a camera and a transmission mechanism being located in the accommodating cavity, the camera being connected to the transmission mechanism, wherein the camera moves from the inside of the accommodating cavity to the outside of the accommodating cavity under the action of the transmission mechanism; in a case that the camera is located in the accommodating cavity, the protective cover is located in the accommodating cavity and between the first opening and the camera, and the camera is located under the display screen; and in a case that the camera is located outside the accommodating cavity, the protective cover is located outside the accommodating cavity, and the camera is located in an inner cavity of the protective cover.

16 Claims, 3 Drawing Sheets

(51) Int. Cl.
*H04N 23/51* (2023.01)
*H04N 23/57* (2023.01)

(56) References Cited

U.S. PATENT DOCUMENTS

| | | | |
|---|---|---|---|
| 2016/0352384 A1 | 12/2016 | Ageishi | |
| 2018/0262663 A1 | 9/2018 | Zhang | |
| 2019/0253538 A1* | 8/2019 | Li | H01F 7/20 |
| 2020/0374433 A1* | 11/2020 | Zhang | H04N 23/00 |
| 2022/0174138 A1* | 6/2022 | Lee | H04M 1/0264 |
| 2023/0215339 A1* | 7/2023 | Yoon | G09G 3/3225 |
| | | | 345/690 |

FOREIGN PATENT DOCUMENTS

| | | |
|---|---|---|
| CN | 208128324 U | 11/2018 |
| CN | 110266845 A | 9/2019 |
| CN | 209358584 U | 9/2019 |
| CN | 110719391 A | 1/2020 |
| WO | 2019157859 A1 | 8/2019 |

OTHER PUBLICATIONS

First Office Action for Korean Application No. 10-2022-7016195, dated Jan. 29, 2024, 5 Pages.

\* cited by examiner

ELECTRONIC DEVICE

CROSS-REFERENCE TO RELATED APPLICATIONS

This application is continuation application of PCT International Application No. PCT/CN2020/123902 filed on Oct. 27, 2020, which claims priority to Chinese Patent Application No. 201911053904.X filed on Oct. 31, 2019, which are incorporated herein by reference in their entireties.

TECHNICAL FIELD

The present invention relates to the technical field of electronic devices, and in particular, to an electronic device.

BACKGROUND

With the rapid development of electronic technology, users have an increasingly strong demand for full screens of electronic devices. The emergency of pop-up cameras has increased the screen-to-body ratio. When it is necessary to take pictures, the pop-up camera can be extended out of the shell from the inside of the shell of the electronic device to take pictures, thereby providing technical support for full screens and providing a brand-new visual experience for users.

However, the external environment is complex, and the pop-up camera is easily interfered by external factors in the process of extending out of the shell to take pictures. For example, water and dust are easy to enter after the camera is extended, and the camera is liable to damage, resulting in short service life of the camera.

SUMMARY

Embodiments of the present invention provide an electronic device.

The embodiments of the present invention are implemented as follows:

The embodiments of the present invention provide an electronic device, including:
- a display screen and a device shell, an accommodating cavity being formed between the display screen and the device shell, and a first opening being formed on a frame of the device shell;
- a protective cover, the protective cover having an inner cavity; and
- a camera and a transmission mechanism, the transmission mechanism being located in the accommodating cavity, and the camera being connected to the transmission mechanism,
wherein the camera moves from the inside of the accommodating cavity to the outside of the accommodating cavity under the action of the transmission mechanism; in a case that the camera is located in the accommodating cavity, the protective cover is located in the accommodating cavity and between the first opening and the camera, and the camera is located under the display screen; and in a case that the camera is located outside the accommodating cavity, the protective cover is located outside the accommodating cavity, and the camera is located in an inner cavity of the protective cover.

In one embodiment, the electronic device further includes an elastic piece, wherein one end of the elastic piece is connected to the bottom of the protective cover, and the other end of the elastic piece is connected to the camera.

In one embodiment, the electronic device further includes a first magnetic piece and a second magnetic piece, wherein the first magnetic piece is arranged on an inner surface of a first side wall of the protective cover; the second magnetic piece is arranged on a first side of the camera close to the inner surface; and in a case that the camera is located outside the accommodating cavity, the inner surface of the first side wall is opposite to the first side, and the first magnetic piece and the second magnetic piece are attracted to each other.

In one embodiment, the electronic device further includes:
- a first supporting piece and a second supporting piece which are arranged at intervals, wherein the first supporting piece and the second supporting piece are placed at the device shell and located in the accommodating cavity, a space between the first supporting piece and the second supporting piece is opposite to the first opening, and the inner cavity and the space are opposite to and communicate with each other; and
- in a case that the camera is located in the accommodating cavity, the protective cover is located on one side of the first supporting piece close to the first opening and on one side of the second supporting piece close to the first opening, and is located between the first opening and the space, a first part of one end of the protective cover that is close to the first supporting piece is in contact with the first supporting piece, a second part of one end of the protective cover is in contact with the second supporting piece, and the camera is located in the space.

In one embodiment, the protective cover includes a cover body and an edge protrusion around an outer side of one end of the cover body; a second opening is formed at one end of the cover body; the second opening communicates with the inner cavity; the inner cavity communicates with the space through the second opening; in a case that the camera is located in the accommodating cavity, one part of the edge protrusion is placed on one side of the first supporting piece and is in contact with the first supporting piece, the other part of the edge protrusion is placed on one side of the second supporting piece and is in contact with the second supporting piece; and in a case that the camera is located outside the accommodating cavity, the edge protrusion is in contact with the edge part of the first opening of the frame.

In one embodiment, the electronic device further includes a third magnetic piece and a fourth magnetic piece, wherein the third magnetic piece is placed at a first area of the edge protrusion close to one side of a target supporting piece; the fourth magnetic piece is placed at a second area in one side of the target supporting piece; the first area is opposite to the second area; the target supporting piece is the first supporting piece or the second supporting piece; and in a case that the camera is located in the accommodating cavity, the third magnetic piece and the fourth magnetic piece are attracted to each other.

In one embodiment, the transmission mechanism includes a transmission rod, a transmission wheel engaged with the transmission rod, and a motor connected to the transmission wheel; and the camera is placed at one end of the transmission rod.

Under the rotation action of the motor, the transmission wheel is driven to rotate; and under the rotation action of the transmission wheel, the transmission rod is driven to move relative to the first opening in the accommodating cavity so as to be away from or close to the first opening.

In one embodiment, the elastic piece is a spring.

In one embodiment, the number of the elastic pieces is at least two.

In one embodiment, the protective cover is a glass transparent cover.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are some rather than all of the embodiments of the present invention. All other embodiments obtained by a person of ordinary skill in the art based on the embodiments of the present invention without creative efforts shall fall within the protection scope of the present invention.

Figure 1:
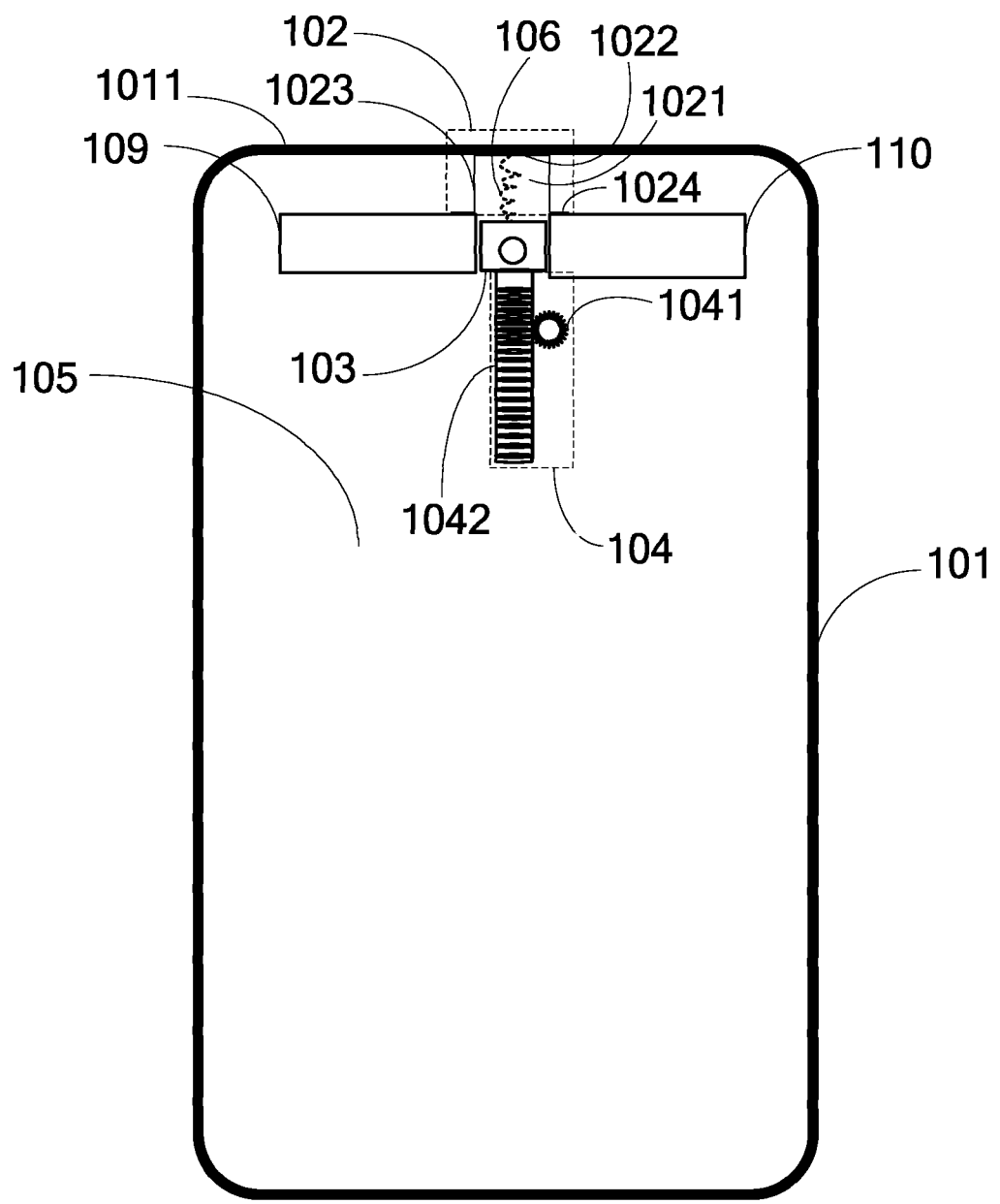
FIG. 1 is a first hardware structure diagram of an electronic device according to an embodiment of the present invention.

As shown in FIG. 1, the present invention provides an electronic device of an embodiment, including: a display screen (not shown in the figure), a device shell 101, a protective cover 102, a camera 103 and a transmission mechanism 104. An accommodating cavity 105 is formed between the display screen and the device shell 101, and a first opening is formed on a frame 1011 of the device shell 101. The protective cover 102 has an inner cavity 1021. The transmission mechanism 104 is located in the accommodating cavity 105, and the camera 103 is connected to the transmission mechanism 104. Under the action of the transmission mechanism 104, the camera 103 moves from the inside of the accommodating cavity 105 to the outside of the accommodating cavity 105, which may be understood that under the action of the transmission mechanism 104, the camera 103 has a first state and a second state. In a case that the camera 103 is located in the accommodating state 105 (which may be understood as in the first state), the protective cover 102 is located in the accommodating cavity 105 and between the first opening and the camera 103, and the camera 103 is located under the display screen. In a case that the camera 103 is located outside the accommodating cavity 105 (which may be understood as in the second state), the protective cover 102 is located outside the accommodating cavity 105, and the camera 103 is located in an inner cavity 1021 of the protective cover 102. That is, in the process that the camera 103 moves from the inside of the accommodating cavity 105 to the outside of the accommodating cavity 105, the camera 103 and the protective cover 102 move from the inside of the accommodating cavity 105 to the outside of the accommodating cavity 105 and pass through the first opening to extend out of the accommodating cavity 105. In addition, the camera 103 may also move from the outside of the accommodating cavity 105 to the inside of the accommodating cavity 105, that is, the camera 103 may be switched from the outside of the accommodating cavity 105 to the inside of the accommodating cavity 105.

That is, a first opening is formed at a frame 1011 of the device shell 101 of the electronic device for the protective cover 102 and the camera 103 to pass through so as to extend out of the frame 1011, that is, to extend out of the accommodating cavity 105. A transmission mechanism 104 is arranged in the accommodating cavity 105 of the electronic device, and the camera 103 is connected to the transmission mechanism 104. During rotation, the transmission mechanism 104 may drive the camera 103 to move, so that the camera 103 may move from the inside of the accommodating cavity 105 to the outside of the accommodating cavity 105, or may move from the outside of the accommodating cavity 105 to the inside of the accommodating cavity 105, that is, the camera has a first state and a second state. That is, under the action of the transmission mechanism 104, the camera 103 has a first state and a second state. Different rotating directions of the transmission mechanism 104 make the camera 103 have different states, that is, the camera 103 may be switched between the first state and the second state according to the rotating direction of the transmission mechanism 104. For example, the camera 103 is in the first state initially, that is, the camera 103 is in the accommodating cavity 105, the protective cover is also in the accommodating cavity 105, the camera 103 may be directly opposite to the inner cavity 1021, and the transmission mechanism 104 rotates along a first direction and drives the camera 103 to move in a direction from the inside of the accommodating cavity 105 to the outside of the accommodating cavity 105, so that the camera 103 extends out of the accommodating cavity 105 from the first opening of the frame 1011, and the camera 103 moves from the inside of the accommodating cavity 105 to the outside of the accommodating cavity 105, that is the camera is switched to the second state. The transmission mechanism 104 rotates along a second direction opposite to the first direction and drives the camera 103 to move from the outside of the accommodating cavity 105 to the inside of the accommodating cavity 105, so that the camera 103 returns to the inside of the accommodating cavity 105 from the outside of the accommodating cavity 105, and the camera 103 moves from the outside of the accommodating cavity 105 to the inside of the accommodating cavity 105, that is, the camera is switched to the first state.

In the first state, the camera 103 is located in the accommodating cavity 105, and the camera 103 is under the display screen, which may be understood that one side of the display screen facing the accommodating cavity 105 is under the display screen, on the inner side of the electronic device. The camera 103 may shoot along a direction facing the display screen, that is, the camera 103 may shoot under the screen; furthermore, in the first state, the protective cover 102 is located between the first opening and the camera 103, that is, the camera 103 is separated from the protective cover 102, and interference between the display screen and the camera 103 is avoided, that is, the protective cover 102 will not interfere the shooting of the camera 103, so that the shooting effect of the camera 103 under the screen can be improved.

In the second state, the camera 103 and the protective cover 102 move out of the accommodating cavity 105, and the camera 103 is located in an inner cavity 1021 of the protective cover 102, that is, outside the accommodating cavity 105, the camera 103 is in the inner cavity 1021 of the protective cover 102, and the protective cover 102 may cover the whole camera 103, so that the interference to the camera by the external factor can be reduced, and the possibility that the camera is damaged or smudged can be reduced, that is, the protective cover 102 play a protection role, the damage situation of the camera can be reduced, and the service life of the camera can be prolonged.

In the electronic device provided by the embodiments of the present application, a transmission mechanism 104 is provided; the camera 103 may move from the inside of the accommodating cavity 105 to the outside of the accommodating cavity 105 through the transmission mechanism 104; in a case that the camera 103 is located in the accommodating cavity 105, the protective cover 102 is located in the accommodating cavity 105 and between the first opening and the camera 103; in a case that the camera 103 is located under the display screen, that is, the camera 103 is located in the accommodating cavity 105, the camera 103 may shoot under the screen, so that the influence of the protective cover 102 on light transmission can be avoided, the influence on the shooting quality due to light reflection between the protective cover 102 and the display screen can also be avoided, that is, the protective cover 102 will not affect the shooting of the camera 103, and the shooting quality is improved. In a case that the camera 103 is located outside the accommodating cavity 105, the protective cover 102 is located outside the accommodating cavity 105, and the camera 103 is located in an inner cavity 1021 of the protective cover 102, that is, in the process of switching the first state to the second state, the camera 103 moves and may enter the inner cavity 1021 of the protective cover 102, so that the influence on the camera 103 by the external factor can be avoided through the protective cover 102, the camera 103 is protected, and the service life of the camera can be prolonged. That is, through the electronic device provided by this embodiment, the shooting quality under the screen can be improved, and the service life can be prolonged.

In one example, the electronic device may be, but not limited to a mobile phone, a tablet personal computer, a laptop computer, a personal digital assistant (PDA), a mobile Internet device (MID) or a wearable device.

In one embodiment, the protective cover 102 is a glass transparent cover. That is, when the camera 103 extends out of the accommodating cavity 105 to take pictures, the camera 103 is in the protective cover 102, and since the protective cover 102 is the glass transparent cover, light can be transmitted well, and the camera 103 can sense light well, thereby taking pictures. Moreover, the camera 103 can be protected.

In one embodiment, the electronic device further includes an elastic piece 106, wherein one end of the elastic piece 106 is connected to the bottom 1022 of the protective cover 102, and the other end of the elastic piece 106 is connected to the camera 103.

That is, the elastic piece 106 is connected to the bottom 1022 of the protective cover 102 and the camera 103. In a case that the transmission mechanism 104 rotates along a first direction, the camera 103 moves in a direction from the inside of the accommodating cavity 105 to the outside of the accommodating cavity 105 under the action of the transmission mechanism 104. The camera 103 may compress the elastic piece 106 in the moving process. The elastic force of the elastic piece 106 between the protective cover 102 and the camera 103 will increase. In a case that the elastic force of the elastic piece 106 is greater than a first threshold value (for example, the gravity of the protective cover 102), that is, the elastic piece 106 will have a pushing force on the protective cover 102, the pushing force is from the inside of the accommodating cavity 105 to the outside of the accommodating cavity 105 and is greater than the first threshold value, and the elastic piece may drive the protective cover 102 to move outside together, that is, the camera 103 will push the protective cover 102 through the elastic piece 106 to move outside together. In this way, the camera 103 and the protective cover 102 move outside together and pass through the first opening to extend out of the accommodating cavity 105, so that the camera 103 is switched to the second state. At this time, the camera 103 can take pictures outside the accommodating cavity 105, and the protective cover 102 can protect the camera 103, so that the damage situation of the camera can be reduced, and the service life of the camera can be prolonged.

In addition, in the above case, in a case that the transmission mechanism 104 rotates along a second direction opposite to the first direction, the camera 103 moves in a direction from the outside of the accommodating cavity 105 to the inside of the accommodating cavity 105 under the action of the transmission mechanism 104. The camera 103 stretches the elastic piece 106 in the moving process, and the protective cover 102 moves inside the accommodating cavity 105 together with the camera 103 under action of its own gravity and the pulling force of the elastic piece 106 on the protective cover 102 in a direction from the outside of the accommodating cavity 105 to the inside of the accommodating cavity 105 and passes through the first opening to return into the accommodating cavity 105, so that the camera 103 is switched to the first state. At this time, the camera 103 takes pictures in the accommodating cavity 105, that is, the camera 103 takes pictures under the screen, and since the protective cover 102 is separated from the camera 103, the influence on the camera 103 to take pictures under the screen will be avoided, so that the shooting quality can be improved.

In one embodiment, the elastic piece 106 is a spring. The spring has a simple structure and low cost, and is convenient to mount. Moreover, the spring is arranged between the camera 103 and the bottom 1022 of the protective cover 102, the camera 103 does not need to be in contact with the bottom 1022, and the protective cover 102 can be pushed through the spring, so that the camera 103 can move rapidly together with the protective cover 102, and the camera 103 can be switched to the second state well.

In one embodiment, the number of the elastic piece 106 is at least two. In order to avoid the adverse influence on the state switching process caused by the fact that single elastic piece 106 cannot be used normally due to failure, at least two elastic pieces 106 may be provided, even if one of the elastic pieces 106 cannot be used normally due to failure, the state switching process can be realized through other elastic pieces 106, so that it is ensured that the camera 103 can switch to take pictures between the outside of the accommodating cavity 105 and the inside of the accommodating cavity 105.

In one example, the bottom 1022 of the protective cover 102 is the bottom of the inner cavity 1021, the protective cover 102 has an opening, and the opening communicates with the inner cavity 1021. Furthermore, in the first state, the opening of the protective cover 102 is opposite to the camera 103; and in the process of switching to the second state, the camera 103 enters the inner cavity 1021 of the protective cover 102 through the opening of the protective cover 102, and the camera is protected through the protective cover 102.

In one embodiment, the electronic device further includes a first magnetic piece 107 and a second magnetic piece 108, wherein the first magnetic piece 107 is arranged on an inner surface of a first side wall of the protective cover 102; the second magnetic piece 108 is arranged on a first side of the camera 103 close to the first side wall; and in a case that camera 103 is located outside the accommodating cavity 105, the inner surface of the first side wall is opposite to the first side, and the first magnetic piece 107 and the second magnetic piece 108 are attracted to each other.

That is, in the present application, the protective cover 102 is moved in combination with the attraction principle of the transmission mechanism 104 and the magnetic piece, and the magnetic pole of the first magnetic piece 107 and the magnetic pole of the second magnetic piece 108 close to the first magnetic piece 107 are different. According to the principle that different magnetic poles are attracted to each other, in the moving process of the camera 103, a distance between the first magnetic piece 107 and the second magnetic piece 108 is reduced. When the distance between the first magnetic piece 107 and the second magnetic piece 108 is less than a preset distance, the first magnetic piece 107 and the second magnetic piece 108 will generate an attraction force. In the process that the camera 103 moves from the inside of the accommodating cavity 105 to the outside of the accommodating cavity 105, the attraction force increases along with the increased attraction area of the first magnetic piece 107 and the second magnetic piece 108. In a case that the attraction force is greater than the gravity of the protective cover 102, the protective cover 102 moves out of the accommodating cavity 105 together with the camera 103 through the attraction of the second magnetic piece 108 and the first magnetic piece 107, that is, the protective cover 102 is driven through the attraction between the magnetic pieces and the movement of the camera 103 to move and pass through the first opening to extend out of the accommodating cavity 105, so that the camera 103 is in the second state. At this time, the first magnetic piece 107 and the second magnetic piece 108 are attracted to each other, the attraction force between the first magnetic piece 107 and the second magnetic piece 108 is greater than the gravity pf the protective cover 102, the first magnetic piece 107 and the second magnetic piece 108 are attracted together through the attraction force, that is, the first magnetic piece 107 is connected to the second magnetic piece 108. In a case that the camera 103 is located outside the accommodating cavity 105, the camera 103 is located in an inner cavity 1021 of the protective cover 102. At this time, an inner surface of the first side wall is opposite to the first side, and the first magnetic piece 107 and the second magnetic piece 108 are attracted to each other.

In one embodiment, the electronic device further includes a first supporting piece 109 and a second supporting piece 110 which are arranged at intervals, wherein the first supporting piece 109 and the second supporting piece 110 are placed in the device shell 101 and located in the accommodating cavity 105, the space between the first supporting piece 109 and the second supporting piece 110 is opposite to the first opening, and the inner cavity 1021 is opposite to and communicates with the space.

In a case that the camera 103 is located in the accommodating cavity 105, that is, in the first state, the protective cover 102 is located on one side of the first supporting piece 109 close to the first opening and on one side of the second supporting piece 110 close to the first opening, and is located between the first opening and the space; a first part of one end of the protective cover 102 that is close to the first supporting piece 109 is in contact with the first supporting piece 109; a second part of one end of the protective cover 102 is in contact with the second supporting piece 110; and the camera 103 is located in the space. In the process that the camera 103 moves from the inside of the accommodating cavity 105 to the outside of the accommodating cavity 105, that is, in the process of switching from the first state to the second state, under the action of the transmission mechanism 104, in a case that at least part of the camera 103 extends into the inner cavity 1021 from the space, the camera 103 and the protective cover 102 pass through the first opening and extend out of the accommodating cavity 105, thereby realizing state switching.

That is, the first supporting piece 109 and the second supporting piece 110 are arranged on the device shell 101 and located in the accommodating cavity 105. The protective cover 102 strides the space between the first supporting piece 109 and the second supporting piece 110 and is placed on one side of the first supporting piece 109 and one side of the second supporting piece 110, that is, the space is opposite to and communicates with the inner cavity 1021 of the protective cover 102. One end of the protective cover 102 includes a first part and a second part. In the first state, the first part of one end of the protective cover 102 is in contact with the first supporting piece 109, and the second part is in contact with the second supporting piece 110, which may be understood that the first supporting piece 109 and the second supporting piece 110 support the protective cover 102. At this time, the camera 103 is in the protective cover 102. In the process of switching from the first state to the second state, the camera 103 moves in a direction from the inside to the outside of the accommodating cavity 105 under the action of the transmission mechanism 104. Specifically, the camera 103 starts to move outside from the space. After moving for a certain distance, the camera 103 will push the protective cover 102 to move outside. At this time, at least part of the camera 103 extends out of the space and is placed in the inner cavity 1021 of the protective cover 102 and moves outside together with the protective cover 102 until the protective cover 102 and the camera 103 pass through the first opening and extend out of the accommodating cavity 105, so that the camera 103 is in the second state. In the process of switching from the second state to the first state, the protective cover 102 moves from the outside to the inside of the accommodating cavity 105. When the protective cover moves to be in contact with the first supporting piece 109 and the second supporting piece 110, the first supporting piece 109 and the second supporting piece 110 support the protective cover 102 and limits the continuous movement of the protective cover 102, that is, the protective cover 102 will stay on the first supporting piece 109 and the second supporting piece 110 and does not move downwards any more. The camera 103 continuously move in a direction away from the protective cover 102 under the action of an electric mechanism, is separated from the protective cover 102, and can stay in the space, so that the camera 103 is in the second state.

In one embodiment, the protective cover 102 includes a cover body 1023 and an edge protrusion 1024 around an outer side of one end of the cover body 1023. Moreover, a second opening is formed at one end of the cover body 1023, the second opening communicates with the inner cavity 1021, and the inner cavity 1021 communicates with the space through the inner cavity 1021. In a case that the camera 103 is located in the accommodating cavity 105, one part of the edge protrusion 1024 is placed on one side of the first supporting piece 109 and is in contact with the first supporting piece 109, and the other part of the edge protrusion 1024 is placed on one side of the second supporting piece 110 and is in contact with the second supporting piece 110. In a case that the camera 103 is located outside the accommodating cavity 105, the edge protrusion 1024 is in contact with the edge part of the first opening of the frame 1011.

That is, the bottom 1022 of the protective cover 102 is the bottom 1022 of the cover body 1023, and the edge protrusion 1024 includes one part and the other part. In the first state, one part is in contact with the first supporting piece 109 and the other part is in contact with the second supporting piece 110. Under the action of the transmission mechanism 104, the camera 103 moves outwards, the camera 103 passes through the second opening (which may be understood as the opening of the protective cover 102) at one end of the cover body 1023 of the protective cover 102 to move towards the inner cavity 1021 of the protective cover 102. As the camera 103 moves, the camera 103 can push the protective cover 102 to move together. In a case that the protective cover 102 and the camera 103 pass through the first opening and extends out of the accommodating cavity 105 and the edge protrusion 1024 is in contact with the edge part of the first opening of the frame 1011, the edge part of the first opening can block the edge protrusion 1024 so as to limit the movement of the protective cover 102, prevent the protective cover 102 from falling out and make the camera 103 in the second state. At this time, the protective cove 102 stays in the state that the edge protrusion 1024 is in contact with the edge part of the first opening and will not move outwards any more, the camera 103 is located in the protective cover 102, the protective cover 102 plays a role in protecting the camera 103, and then the camera can be started to preview and acquire a preview image and take pictures.

In one example, the protective cover 102 includes a first side wall, a second side wall, a third side wall, a fourth side wall and a bottom 1022, wherein the first side wall is opposite to the fourth side wall, the second side wall is opposite to the third side wall, the first side wall is perpendicular to and connected to the second side wall and the third side wall respectively, the fourth side wall is perpendicular to and connected to the second side wall and the third side wall respectively, the bottom 1022 is perpendicular to and connected to the first side wall, the second side wall, the third side wall and the fourth side wall respectively, and the first side wall, the second side wall, the third side wall, the fourth side wall and the bottom 1022 form the inner cavity 1021 and the second opening in a surrounding way. In this way, the shape of the protective cover 102 is closer to the shape of the common camera 103, which is beneficial to cooperation of the protective cover 102 and the camera 103.

In one embodiment, the electronic device further includes a third magnetic piece 111 and a fourth magnetic piece 112, wherein the third magnetic piece 111 is placed at a first area of the edge protrusion 1024 close to one side of a target supporting piece; the fourth magnetic piece 112 is placed at a second area in one side of the target supporting piece; the first area is opposite to the second area; the target supporting piece is the first supporting piece 109 or the second supporting piece 110; and in a case that the camera 103 is located in the accommodating cavity 105, the third magnetic piece 111 and the fourth magnetic piece 112 are attracted to each other.

That is, the third magnetic piece 111 is arranged at the first area of the edge protrusion 1024, and one side of the edge protrusion 1024 is close to the target supporting piece, which may be understood as facing the target supporting piece. The fourth magnetic piece 112 is arranged at the second area of the target supporting piece, and one side of the target supporting piece is close to the edge protrusion 1024, which may be understood as facing the edge protrusion 1024. Since the first area is opposite to the second area, the third magnetic piece 111 is also opposite to the fourth magnetic piece 112. In a case that the camera 103 is located in the accommodating cavity 105, that is, in the first state, the target supporting piece supports the protective cover 102, the third magnetic piece 111 and the fourth magnetic piece 112 are attracted to each other. Under the action of the transmission mechanism 104, the camera 103 moves from the inside of the accommodating cavity 105 to the outside of the accommodating cavity 105. Under the movement action of the camera 103, the attraction force of the third magnetic piece 111 and the fourth magnetic piece 112 on the protective cover 102 and the gravity of the protective cover 102 are overcome, the third magnetic piece 111 is separated from the fourth magnetic piece 112, the camera 103 drives the protective cover 102 to move together and pass through the first opening to extend out of the accommodating cavity 105, so that the camera 103 is in the second state. That is, in the second state, the third magnetic piece 111 and the fourth magnetic piece 112 are opposite to and separated from each other, that is, they are spaced. In addition, through the arrangement of the third magnetic piece 111 and the fourth magnetic piece 112, the protective cover 102 and the first supporting piece 109 or the second supporting piece 110 can be attracted in the first state, so that waggling and movement of the protective cover 102 are avoided, the stability of the protective cover 102 is improved, and separation between the camera 103 and the protective cover 102 is facilitated.

In one embodiment, the transmission mechanism 104 includes a transmission rod 1041, a transmission wheel 1042 engaged with the transmission rod 1041, and a motor connected to the transmission wheel 1042, and the camera 103 is placed at one end of the transmission rod 1041.

That is, in this embodiment, the camera 103 is arranged at one end of the transmission mechanism 104, and at one end of the transmission mechanism 104 close to the first opening, it is beneficial for the transmission mechanism 104 to drive the camera 103 to move. Specifically, the camera 103 is placed at one end of the transmission rod 1041. Under the rotating action of the motor, the transmission wheel 1042 is driven to rotate. Under the rotating action of the transmission wheel 1042, the transmission rod 1041 is driven to move relative to the first opening in the accommodating cavity 105 so as to be close to or away from the first opening, and thus, the camera 103 can move from the inside of the accommodating cavity 105 to the outside of the accommodating cavity 105, or move from the outside of the accommodating cavity 105 to the inside of the accommodating cavity 105.

It may be understood that the camera 103 is placed at one end of the transmission rod 1041 close to the first opening, an output shaft of the motor is connected to the transmission wheel 1042, for example, the transmission wheel 1042 may be arranged on the output shaft, the rotating direction of the transmission wheel 1042 is consistent with the rotating direction of the output shaft, the motor rotates to drive the transmission wheel 1042 to rotate, and the transmission wheel 1042 rotates to drive the transmission rod 1041 to move close to or away from the first opening. For example, the motor rotates along a first direction, drives the transmission wheel 1042 to rotate along the first direction and drives the transmission rod 1041 to move in a direction from the inside of the accommodating cavity 105 to the outside of the accommodating cavity 105, that is, the motor drives the transmission rod 1041 to move close to the first opening. The motor rotates along a second direction opposite to the first direction, drives the transmission wheel 1042 to rotate along the second direction, and drives the transmission rod 1041 to move in a direction from the inside of the accommodating cavity 105 to the outside of the accommodating cavity 105, that is, the motor drives the transmission rod 1041 to move away from the first opening. The transmission mechanism 104 is arranged in the electronic device, so the structure is simple, the cost is low and it is convenient to switch the state of the camera 103.

The working process of the electronic device is described specifically below with one specific embodiment.

As shown in FIG. 1, the bottom 1022 of the protective cover 102 and the camera 103 are connected through a spring, the camera 103 is in the first state, the camera 103 is located under the display screen, light enters the camera 103 through the display screen, and the camera 103 senses the incident light to take pictures under the screen. Furthermore, in the first state, the camera 103 is located in a space between the first supporting piece 109 and the second supporting piece 110, the protective cover 102 is between the camera 103 and the first opening, a first part of one end of the protective cover 102 is in contact with the first supporting piece 109, a second part of one end is in contact with the second supporting piece 110, and the first supporting piece 109 and the second supporting piece 110 together support the protective cover 102.

Figure 2:
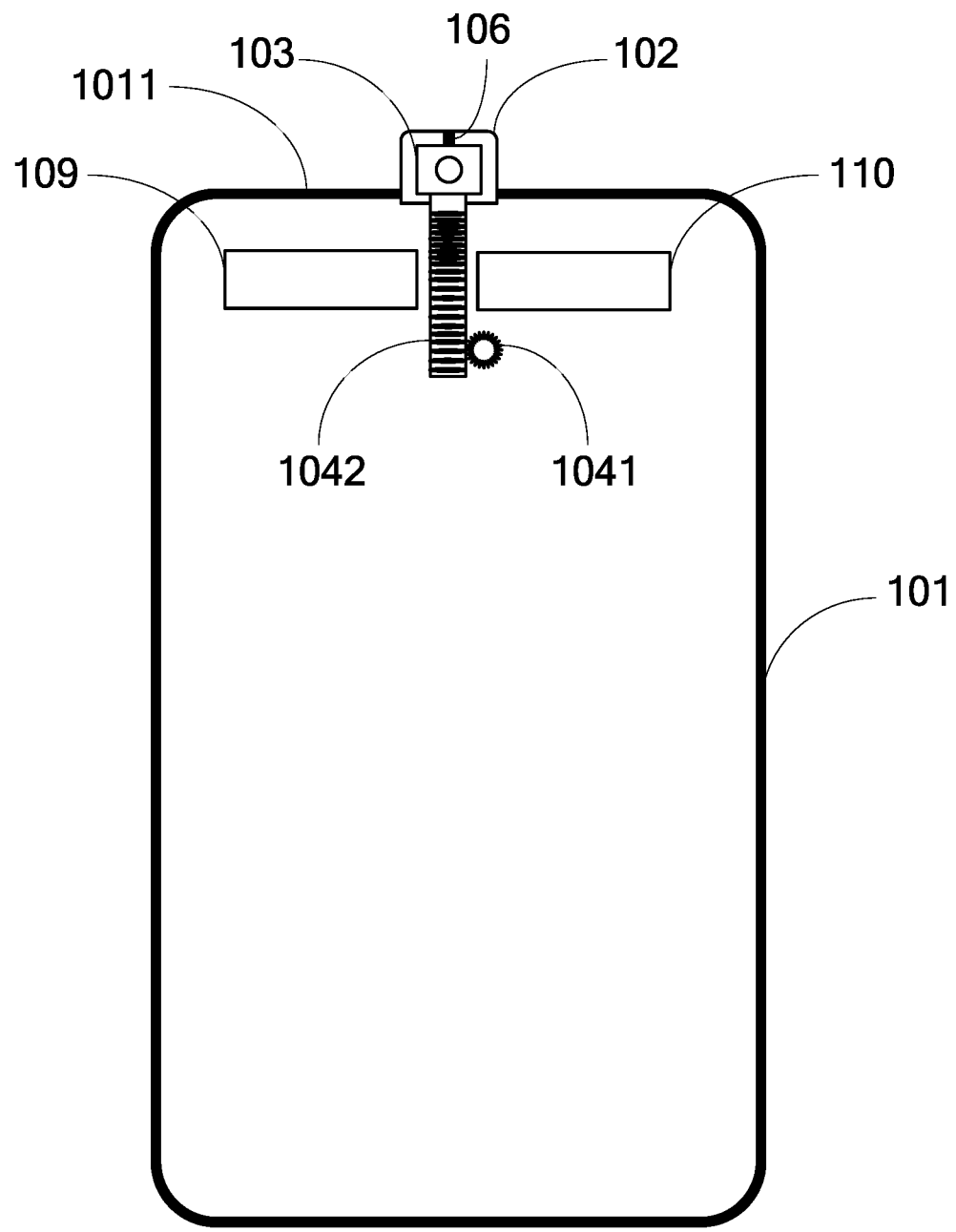
FIG. 2 is a second hardware structure diagram of an electronic device according to an embodiment of the present invention.

After the electronic device receives an instruction of popping up the camera 103 to take pictures, the motor can be controlled to rotate clockwise, the transmission wheel 1042 can be driven to rotate clockwise, and the transmission wheel 1042 rotates clockwise to drive the transmission rod 1041 to move out of the accommodating cavity 105 relative to the first opening. In the moving process, the camera 103 firstly starts to move in the space between the first supporting piece 109 and the second supporting piece 110, enters the inner cavity 1021 of the protective cover 102 through the second opening of the protective cover 102 and compresses the spring step by step. In a case that the camera 103 moves for a certain distance and the elastic force of the spring is greater than the gravity of the protective cover 102, under the action of the elastic force of the spring, the protective cover 102 is driven to move out of the accommodating cavity 105 relative to the first opening until the edge protrusion 1024 of the protective cover 102 is in contact with the edge part of the first opening, the edge part blocks the edge protrusion 1024, and the protective cover 102 cannot move to prevent the protective cover 102 from falling out, thereby stopping the movement of the camera 103 in the protective cover 102. At this time, the camera 103 is in the second state, as shown in FIG. 2. The protective cover 102 and the camera 103 are outside the accommodating cavity 105, the camera 103 is in the protective cover 102, and the protective cover 102 plays in a role in protecting the camera 103. At this time, the camera 103 may shoot outside the accommodating cavity 105.

After the electronic device receives an instruction of retracting the camera 103 to shoot, the motor is controlled to rotate anticlockwise, the transmission wheel 1042 is driven to rotate anticlockwise, and the transmission wheel 1042 rotates anticlockwise to drive the transmission rod 1041 to move relative to the first opening in the accommodating cavity 105, so as to drive the camera 103 to move inside the accommodating cavity 105. Due to the action of the gravity of the protective cover 102 and the pulling force of the spring, the protective cover 102 will be retracted together with the camera 103, and the pulling force of the spring plays a role in preventing the protective cover 102 from sliding outwards. In the moving process of the camera 103, the camera 103 firstly drives the protective cover 102 to pass through the first opening to enter the accommodating cavity 105 until the edge protrusion 1024 of the protective cover 102 is in contact with the first supporting piece 109 and the second supporting piece 110. The first supporting piece 109 and the second supporting piece 110 block the edge protrusion 1024, so that the protective cover 102 cannot move. The camera 103 is driven by the transmission rod 1041 to continuously move so as to be separated from the protective cover 102. The camera 103 can stay in the space between the first supporting piece 109 and the second supporting piece 110. At this time, the camera 103 returns to the first state, as shown in FIG. 1, the camera 103 can take pictures under the screen, and light is directly irradiated through the display screen. Due to the lack of the protective cover 102, the image acquired under the screen is clearer. In this way, the popped camera 103 can be protected from being smudged, and the shooting effect under the screen can be improved.

Figure 3:
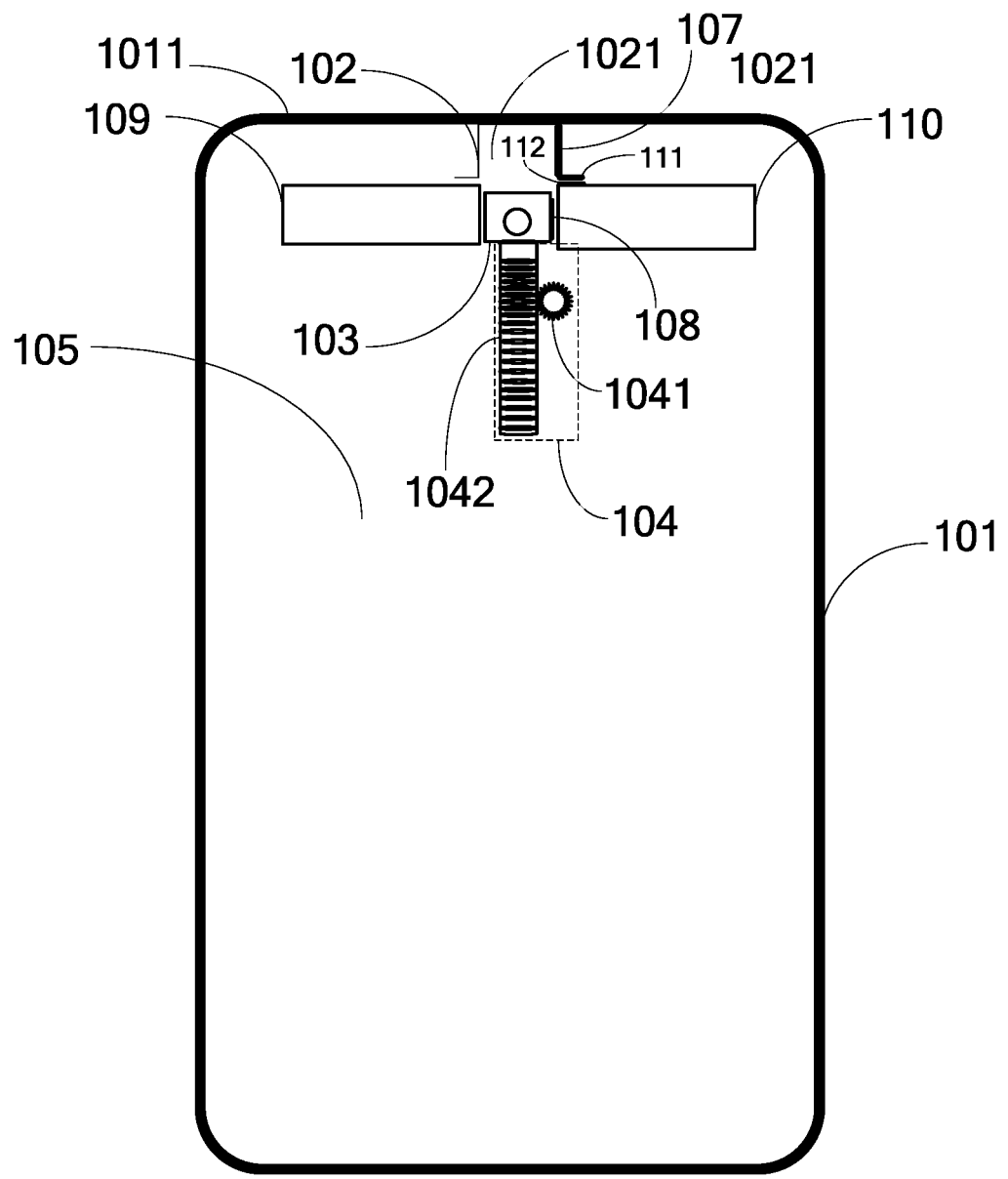
FIG. 3 is a third hardware structure diagram of an electronic device according to an embodiment of the present invention.

In addition to that the camera 103 and the protective cover 102 can move together through the spring, the camera 103 and the protective cover 102 can move together through a magnet (such as magnet). As shown in FIG. 3, a first magnet is arranged on an inner surface of a first side wall of the protective cover 102, a second magnet is arranged on a first side of the camera 103, the first side of the camera 103 is opposite to a second side of the second supporting piece 110, the second side of the second supporting piece 110 is adjacent to and perpendicular to one side of the second supporting piece 110 and is opposite to a third side of the first supporting piece 109, the third side of the first supporting piece 109 is adjacent to and perpendicular to one side of a second supporting piece, and the space is between the first side of the first supporting piece 109 and the second side of the second supporting piece 110. A third magnet is arranged on the first area of the edge protrusion 1024, and a fourth magnet is arranged on the second area of the second supporting piece 110. The camera 103 is in the first state, the camera 103 is located under the display screen, light enters the camera 103 through the display screen, and the camera 103 senses the incident light to take pictures under the screen. Furthermore, in the first state, the camera 103 is located in the space between the first supporting piece 109 and the second supporting piece 110, the protective cover 102 is between the camera 103 and the first opening, the third magnet and the fourth magnet are attracted together, the first area of the edge protrusion 1024 is in contact with the second area of the second supporting piece 110 through the attraction of the third magnet and the fourth magnet, and the first supporting piece 109 and the second supporting piece 110 together support the protective cover 102.

After the electronic device receives an instruction of popping up the camera 103 to take pictures, the motor can be controlled to rotate clockwise, the transmission wheel 1042 can be driven to rotate clockwise, and the transmission wheel 1042 rotates clockwise to drive the transmission rod 1041 to move out of the accommodating cavity 105 relative to the first opening. In the moving process, the camera 103 firstly starts to move in the space between the first supporting piece 109 and the second supporting piece 110, and enters the inner cavity 1021 of the protective cover 102 through the second opening of the protective cover 102. An attraction force is generated between the second magnet on the first side of the camera 103 and the second magnet on the inner surface of the first side wall of the protective cover 102. In a case that the camera 103 moves for a certain distance, the attraction force between the first magnet and the second magnet is greater than the gravity of the protective cover 102, through the attraction of the first magnet and the second magnet and the attraction of the camera 103 and the protective cover 102, the camera 103 moves to drive the protective cover 102 to move together. When the edge protrusion 1024 of the protective cover 102 is in contact with the edge part of the first opening, the edge part blocks the edge protrusion 1024, so that the protective cover 102 cannot move, the protective cover 102 is prevented from falling out, and the movement of the camera 103 in the protective cover 102 is stopped. At this time, the camera 103 is in the second state. The protective cover 102 and the camera 103 are outside the accommodating cavity 105, the camera 103 is in the protective cover 102, and the protective cover 102 plays in a role in protecting the camera 103. At this time, the camera 103 may shoot outside the accommodating cavity 105.

After the electronic device receives an instruction of retracting the camera 103 to shoot, the motor is controlled to rotate anticlockwise, the transmission wheel 1042 is driven to rotate anticlockwise, and the transmission wheel 1042 rotates anticlockwise to drive the transmission rod 1041 to move relative to the first opening in the accommodating cavity 105, so as to drive the camera 103 to move inside the accommodating cavity 105. Due to the attraction action of the first magnet and the second magnet and the gravity of the protective cover 102, the protective cover 102 will be retracted together with the camera 103. In the moving process of the camera 103, the camera 103 firstly drives the protective cover 102 to pass through the first opening to enter the accommodating cavity 105 until the edge protrusion 1024 of the protective cover 102 is in contact with the first supporting piece 109 and the second supporting piece 110. Specifically, the first area of the edge protrusion 1024 is in contact with the second area of the second supporting piece 110 through the attraction of the third magnet and the fourth magnet, the first supporting piece 109 and the second supporting piece 110 block the edge protrusion 1024, so that the protective cover 102 cannot move, and through the attraction of the third magnet and the fourth magnet, the protective cover 102 is more fixed and is prevented from sliding. The camera 103 is driven by the transmission rod 1041 to continuously move so as to be separated from the protective cover 102. The camera 103 can stay in the space between the first supporting piece 109 and the second supporting piece 110. At this time, the camera 103 returns to the first state, as shown in FIG. 3, the camera 103 can take pictures under the screen, and light is directly irradiated through the display screen. Due to the lack of the protective cover 102, the image acquired under the screen is clearer. In this way, the popped camera 103 can be protected from being smudged, and the shooting effect under the screen can be improved.

The technical features of the above embodiments may be arbitrarily combined. For brevity of description, all possible combinations of the technical features in the above embodiments are not described. However, as long as there is no contradiction between the combinations of these technical features, all these combinations should be considered as the scope of this specification.

What is claimed is:

1. An electronic device, comprising:
    a display screen and a device shell, an accommodating cavity being formed between the display screen and the device shell, and a first opening being formed on a frame of the device shell;
    a protective cover, the protective cover having an inner cavity; and
    a camera and a transmission mechanism, the transmission mechanism being located in the accommodating cavity, and the camera being connected to the transmission mechanism,
    wherein the camera moves from the inside of the accommodating cavity to the outside of the accommodating cavity under the action of the transmission mechanism; such that, in a first state, the camera is located in the accommodating cavity, the protective cover is located in the accommodating cavity and between the first opening and the camera, and the camera is located under the display screen; and such that, in a second state, the camera is located outside the accommodating cavity, the protective cover is located outside the accommodating cavity, and the camera is located in an inner cavity of the protective cover.

2. The electronic device according to claim 1, further comprising an elastic piece, wherein one end of the elastic piece is connected to the bottom of the protective cover, and the other end of the elastic piece is connected to the camera.

3. The electronic device according to claim 1, further comprising a first magnetic piece and a second magnetic piece, wherein the first magnetic piece is arranged on an inner surface of a first side wall of the protective cover; the second magnetic piece is arranged on a first side of the camera close to the inner surface; and in a case that the camera is located outside the accommodating cavity, the inner surface of the first side wall is opposite to the first side, and the first magnetic piece and the second magnetic piece are attracted to each other.

4. The electronic device according to claim 1, further comprising:
    a first supporting piece and a second supporting piece which are arranged at intervals, wherein the first supporting piece and the second supporting piece are placed at the device shell and located in the accommodating cavity, a space between the first supporting piece and the second supporting piece is opposite to the first opening, and the inner cavity and the space are opposite to and communicate with each other; and
    in a case that the camera is located in the accommodating cavity, the protective cover is located on one side of the first supporting piece close to the first opening and on one side of the second supporting piece close to the first opening, and is located between the first opening and the space, a first part of one end of the protective cover that is close to the first supporting piece is in contact with the first supporting piece, a second part of one end of the protective cover is in contact with the second supporting piece, and the camera is located in the space.

5. The electronic device according to claim 4, wherein the protective cover comprises a cover body and an edge protrusion around an outer side of one end of the cover body; a second opening is formed at one end of the cover body; the second opening communicates with the inner cavity; the inner cavity communicates with the space through the second opening; in a case that the camera is located in the accommodating cavity, one part of the edge protrusion is placed on one side of the first supporting piece and is in contact with the first supporting piece, the other part of the edge protrusion is placed on one side of the second supporting piece and is in contact with the second supporting piece; and in a case that the camera is located outside the accommodating cavity, the edge protrusion is in contact with the edge part of the first opening of the frame.

6. The electronic device according to claim 5, further comprising a third magnetic piece and a fourth magnetic piece, wherein the third magnetic piece is placed at a first area of the edge protrusion close to one side of a target supporting piece; the fourth magnetic piece is placed at a second area in one side of the target supporting piece; the first area is opposite to the second area; the target supporting piece is the first supporting piece or the second supporting piece; and in a case that the camera is located in the accommodating cavity, the third magnetic piece and the fourth magnetic piece are attracted to each other.

7. The electronic device according to claim 1, wherein the transmission mechanism comprises a transmission rod, a transmission wheel engaged with the transmission rod, and a motor connected to the transmission wheel; the camera is placed at one end of the transmission rod;
under the rotation action of the motor, the transmission wheel is driven to rotate; and under the rotation action of the transmission wheel, the transmission rod can be driven to move relative to the first opening in the accommodating cavity so as to be away from or close to the first opening.

8. The electronic device according to claim 2, wherein the elastic piece is a spring.

9. The electronic device according to claim 2, wherein the number of the elastic pieces is at least two.

10. The electronic device according to claim 8, wherein the number of the elastic pieces is at least two.

11. The electronic device according to claim 1, wherein the protective cover is a glass transparent cover.

12. The electronic device according to claim 2, wherein the transmission mechanism comprises a transmission rod, a transmission wheel engaged with the transmission rod, and a motor connected to the transmission wheel; the camera is placed at one end of the transmission rod;
under the rotation action of the motor, the transmission wheel is driven to rotate; and under the rotation action of the transmission wheel, the transmission rod can be driven to move relative to the first opening in the accommodating cavity so as to be away from or close to the first opening.

13. The electronic device according to claim 3, wherein the transmission mechanism comprises a transmission rod, a transmission wheel engaged with the transmission rod, and a motor connected to the transmission wheel; the camera is placed at one end of the transmission rod;
under the rotation action of the motor, the transmission wheel is driven to rotate; and under the rotation action of the transmission wheel, the transmission rod can be driven to move relative to the first opening in the accommodating cavity so as to be away from or close to the first opening.

14. The electronic device according to claim 4, wherein the transmission mechanism comprises a transmission rod, a transmission wheel engaged with the transmission rod, and a motor connected to the transmission wheel; the camera is placed at one end of the transmission rod;
under the rotation action of the motor, the transmission wheel is driven to rotate; and under the rotation action of the transmission wheel, the transmission rod can be driven to move relative to the first opening in the accommodating cavity so as to be away from or close to the first opening.

15. The electronic device according to claim 5, wherein the transmission mechanism comprises a transmission rod, a transmission wheel engaged with the transmission rod, and a motor connected to the transmission wheel; the camera is placed at one end of the transmission rod;
under the rotation action of the motor, the transmission wheel is driven to rotate; and under the rotation action of the transmission wheel, the transmission rod can be driven to move relative to the first opening in the accommodating cavity so as to be away from or close to the first opening.

16. The electronic device according to claim 6, wherein the transmission mechanism comprises a transmission rod, a transmission wheel engaged with the transmission rod, and a motor connected to the transmission wheel; the camera is placed at one end of the transmission rod;
under the rotation action of the motor, the transmission wheel is driven to rotate; and under the rotation action of the transmission wheel, the transmission rod can be driven to move relative to the first opening in the accommodating cavity so as to be away from or close to the first opening.

\* \* \* \* \*